Sept. 13, 1938. W. L. THOMAS Re. 20,860

BOX CAR

Original Filed Sept. 6, 1933 9 Sheets-Sheet 1

Inventor

William L. Thomas.

By Francis S. Clarkson

Attorney

Sept. 13, 1938. W. L. THOMAS Re. 20,860

BOX CAR

Original Filed Sept. 6, 1933 9 Sheets-Sheet 2

Inventor
William L. Thomas.
By Lewis S. Clarkson
Attorney

BOX CAR

Original Filed Sept. 6, 1933 9 Sheets-Sheet 3

Inventor
William L. Thomas.

By Francis S. Clarkson

Attorney

Sept. 13, 1938. W. L. THOMAS Re. 20,860
BOX CAR
Original Filed Sept. 6, 1933 9 Sheets-Sheet 4
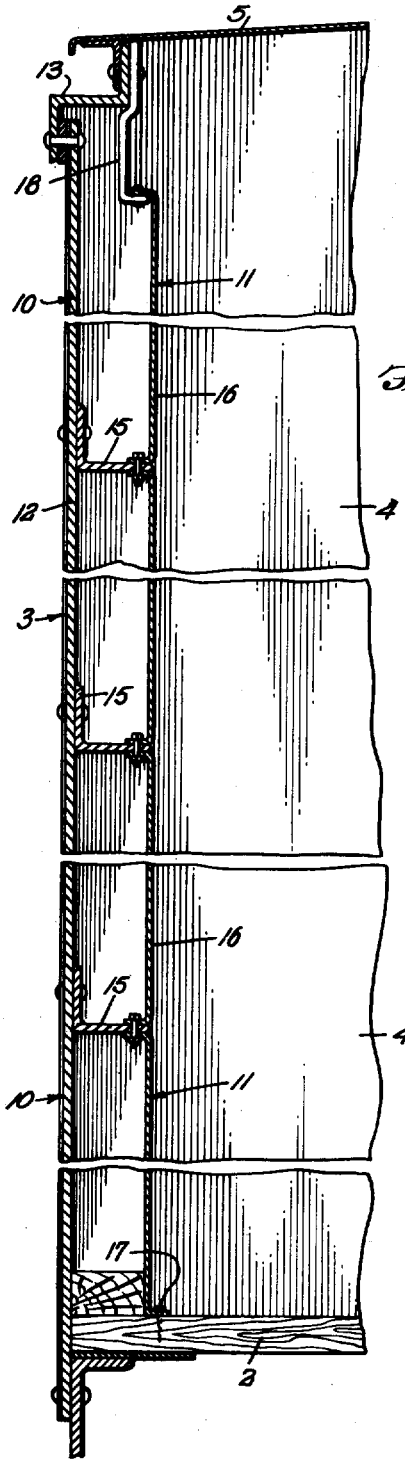
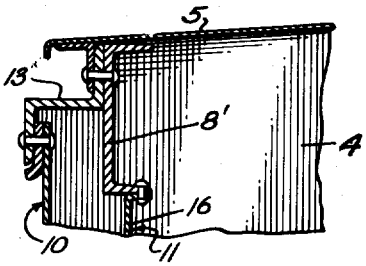
Fig. 6.
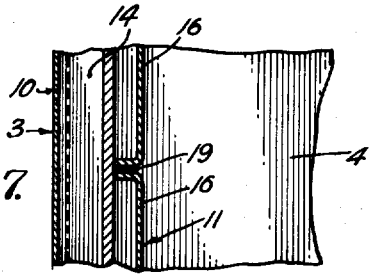
Fig. 3.
Fig. 7.
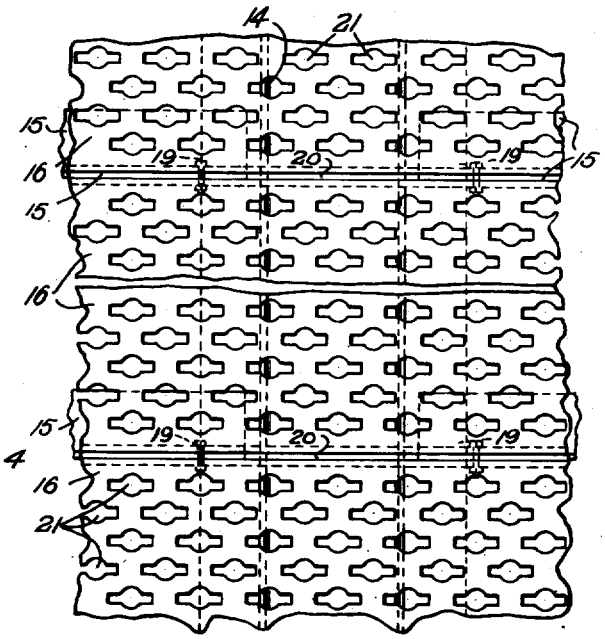
Fig. 5.
Inventor
William L. Thomas.
By Edwin S. Clarkson
Attorney Sept. 13, 1938. W. L. THOMAS Re. 20,860
BOX CAR
Original Filed Sept. 6, 1933 9 Sheets-Sheet 5
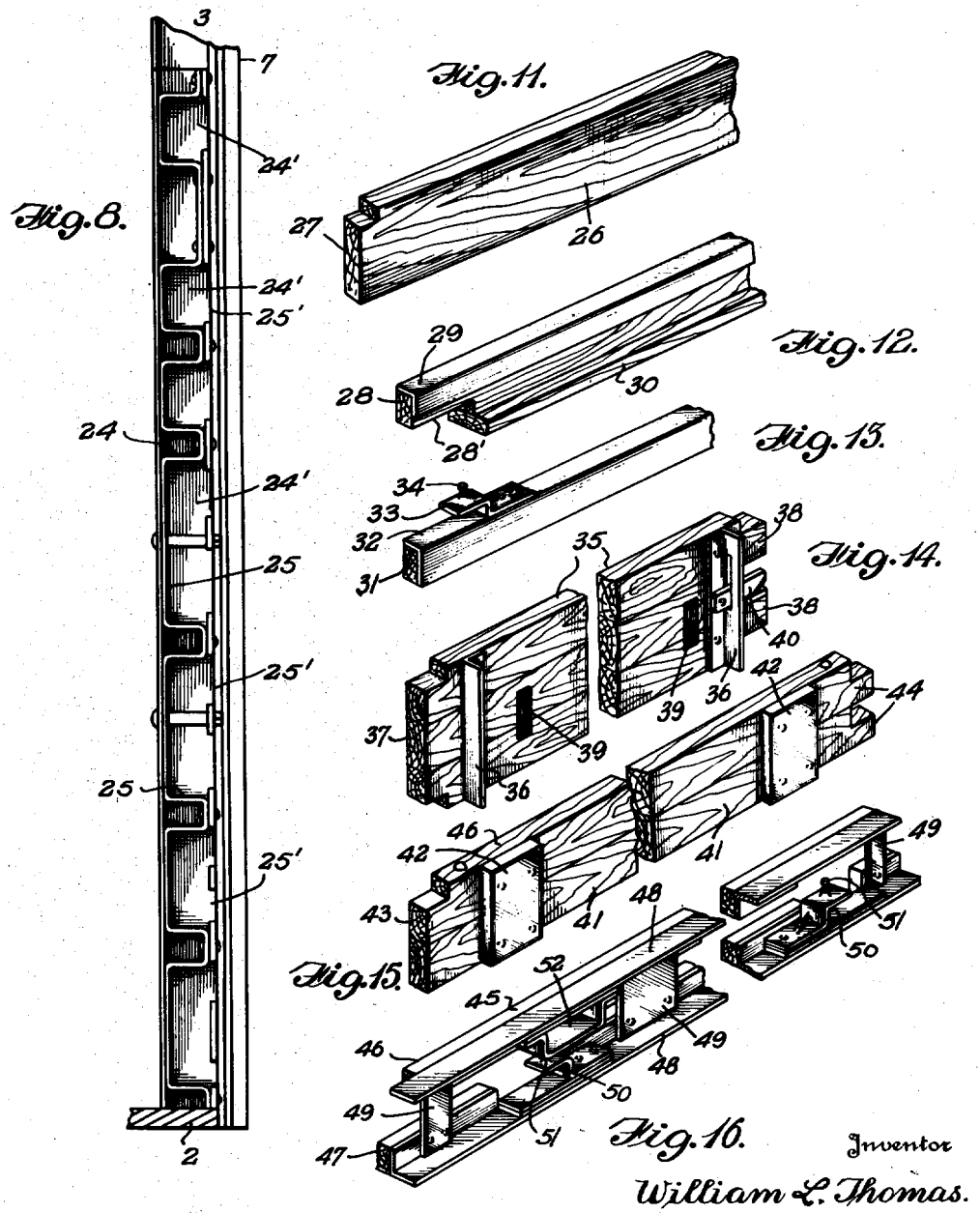
Inventor
William L. Thomas.
By Francis S. Clarkson
Attorney

BOX CAR

Original Filed Sept. 6, 1933 9 Sheets-Sheet 6

Inventor
William L. Thomas

By Edwin S. Clarkson

Attorney

BOX CAR

Original Filed Sept. 6, 1933 9 Sheets-Sheet 7

Inventor

William L. Thomas.

By Arthur S. Clarke

Attorney

BOX CAR

Original Filed Sept. 6, 1933 9 Sheets-Sheet 8

Inventor

William L. Thomas.

By Lewis S. Clarkson

Attorney

BOX CAR

Original Filed Sept. 6, 1933 9 Sheets-Sheet 9

Inventor
William L. Thomas

By Edwin S. Clarkson
Attorney

Reissued Sept. 13, 1938

Re. 20,860

UNITED STATES PATENT OFFICE 20,860

BOX CAR

William L. Thomas, Haverstraw, N. Y., assignor to The New York Central Railroad Company, a corporation of New York Original No. 2,030,773, dated February 11, 1936, Serial No. 688,397, September 6, 1933. Application for reissue December 29, 1937, Serial No. 182,368

24 Claims. (Cl. 105—376)

This invention relates to improvements in box cars of the type designed for shipping mixed freight, or freight consisting of articles or parts of various forms, sizes and compositions, and particularly to a box car adapted for shipping automobile body parts or other automobile parts of various kinds or similar commodities.

The object of the invention is to provide means for readily and conveniently variably partitioning the interior of a box car to divide the same into holding compartments or provide the same with supporting floors or platforms of suitable size or sizes for different kinds or sizes of goods to be shipped, whereby one and the same car may be used to hold mixed kinds and/or sizes of goods in separate lots in such manner as to keep the lots separated from each other and to enable the full capacity of the car to be used for shipment of such goods to the same destination or different destinations.

With the foregoing and other objects in view, the invention consists of the features of construction, combination and arrangement of parts, hereinafter fully described and claimed, reference being had to the accompanying drawings, in which—

Figure 2:
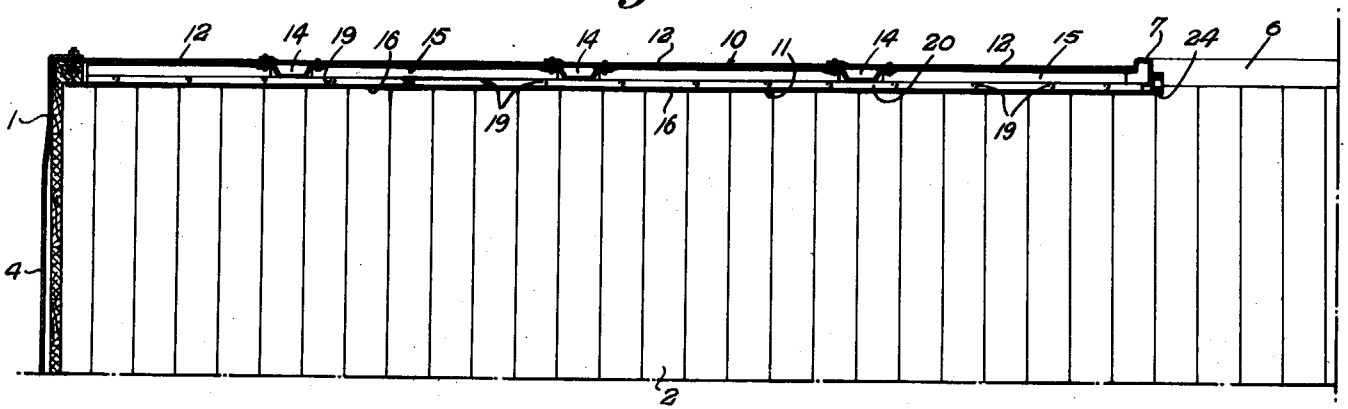
Fig. 2 is a horizontal section through a portion of one of the end walls and a portion of the side wall of the car shown in Fig. 1.
Figure 2A:
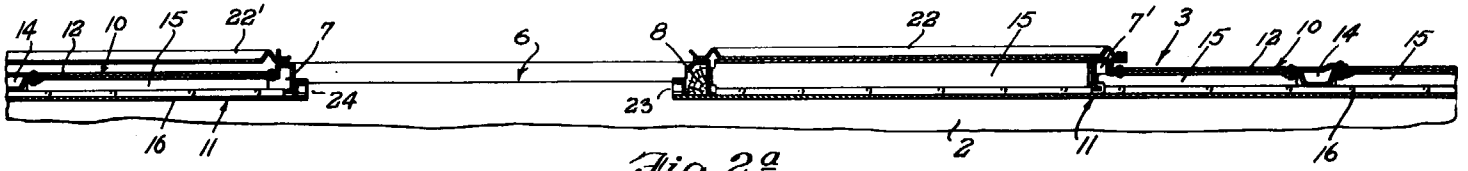

Fig. 2*a* is a horizontal section through one side of the car between standard door posts, showing the doorway construction.

Figure 1:
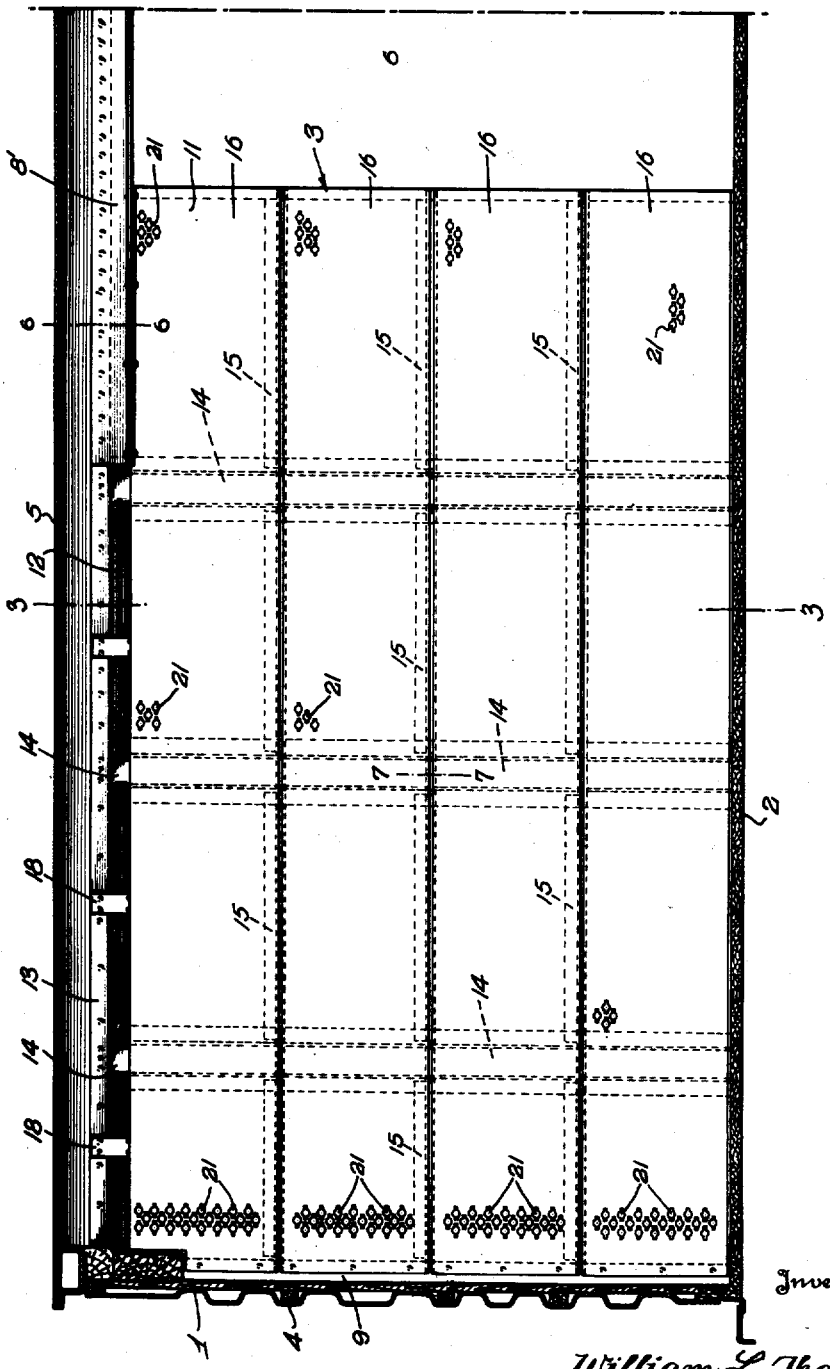
Fig. 1 is a vertical longitudinal section through a portion of a partitionable box car embodying the invention and showing the improved features of construction residing in the car body itself.

Fig. 3 is a vertical transverse section through the car side wall on such a plane as that indicated by line 3—3 of Fig. 1.

Figure 4:
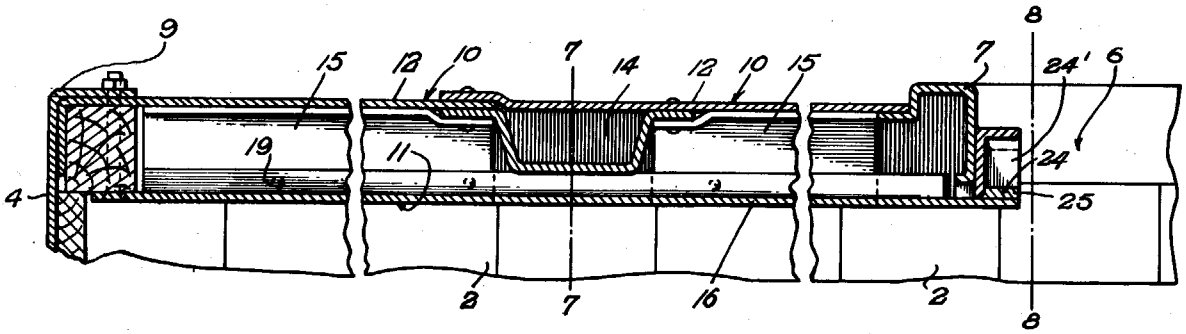

Fig. 4 is a horizontal section similar to Fig. 2 on an enlarged scale and with parts broken away through a side wall of the car.

Fig. 5 is a fragmentary side elevation of one of the perforate inner walls of a side of the car.

Fig. 6 is an enlarged vertical section taken on line 6—6 of Fig. 1.

Fig. 7 is a similar view taken on line 1—1 of Fig. 4.

Fig. 8 is a fragmentary vertical section through one side of the car at the doorway and looking toward one side of the doorway.

Figure 9:
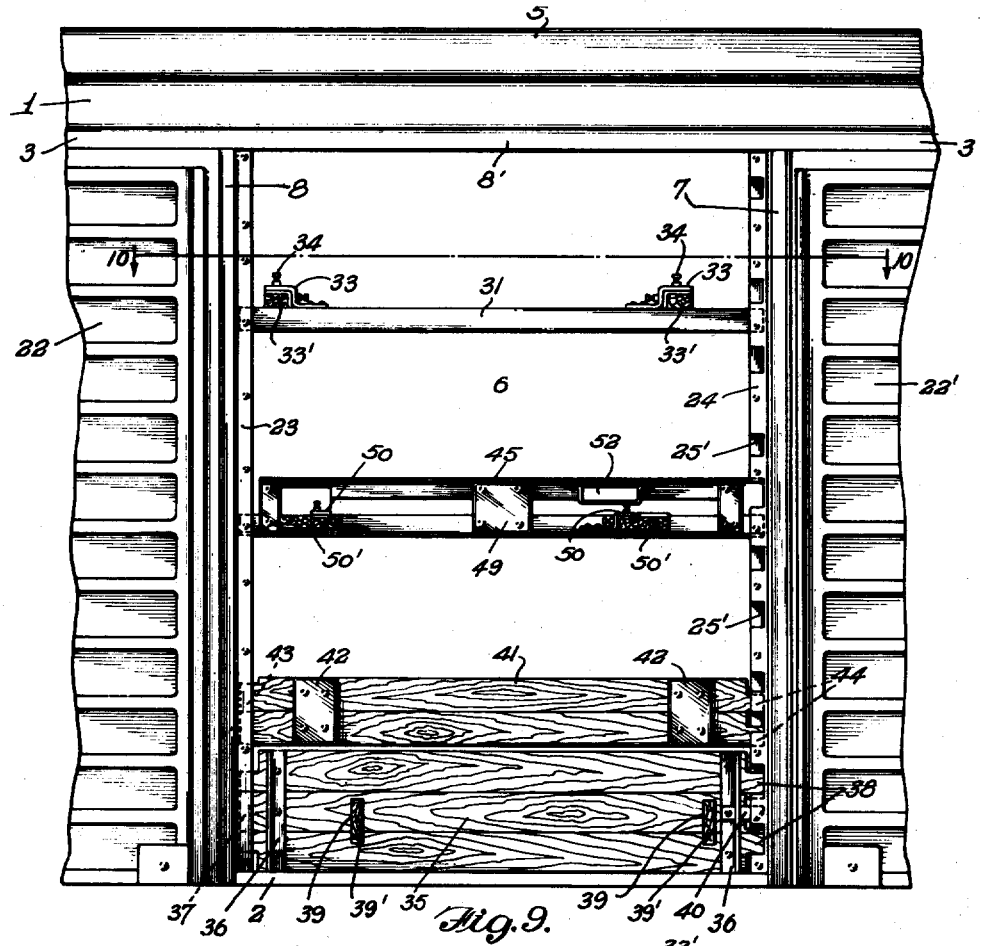

Fig. 9 is a side elevation looking from the exterior toward the doorway at one side of the car.

Figure 10:
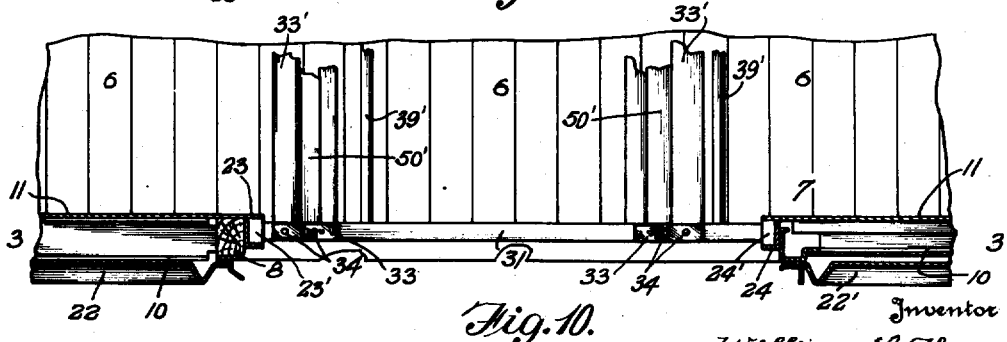

Fig. 10 is a sectional plan view on line 10—10 of Fig. 9.

Figs. 11 to 16, inclusive, are views of various types of longitudinal compartment forming or supporting partitions employed in the doorway region of the car.

Figure 17:
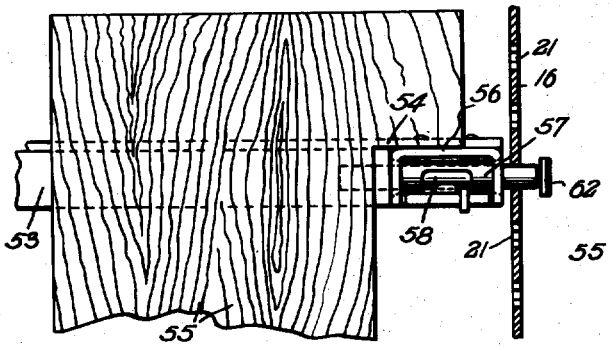
Figure 18:
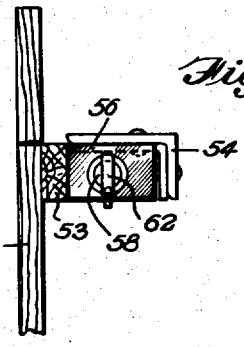
Figure 19:
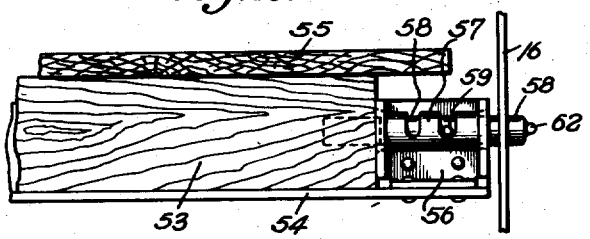

Figs. 17, 18 and 19 are, respectively, a fragmentary side view, an end view and a bottom plan view of a cross piece forming a vertical partition, Figs. 17 and 19 showing the connection of the same with a perforate supporting wall.

Figure 20:
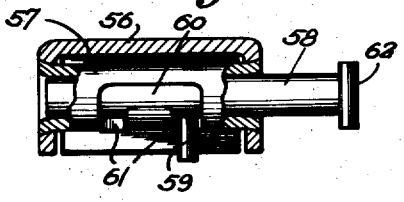

Fig. 20 is a section through the latch pin or bolt shown in Figs. 17, 18 and 19.

Figure 21:
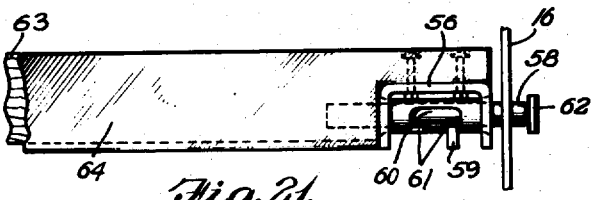
Figure 22:
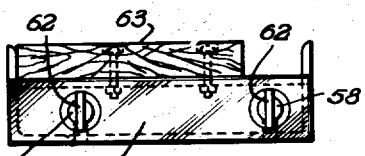

Figs. 21 and 22 are views similar to Figs. 17 and 18 showing another form of cross piece.

Figure 23:
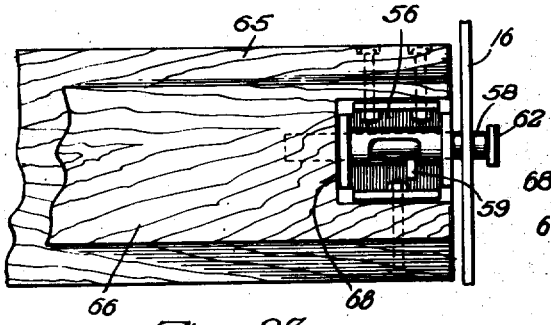
Figure 24:
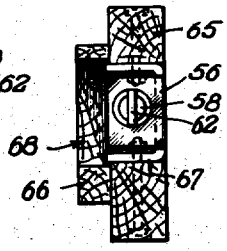

Figs. 23 and 24 are views similar to Figs. 21 and 22 of still another form of cross piece.

Figure 25:
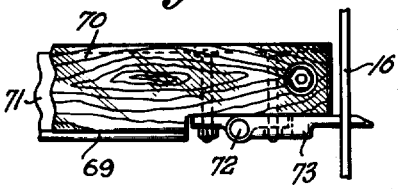
Figure 26:
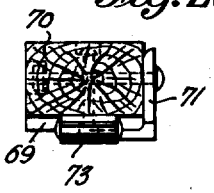
Figure 27:
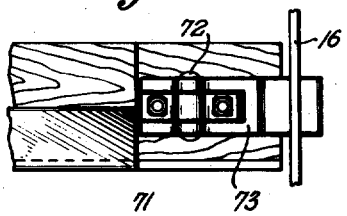

Figs. 25, 26 and 27 are views similar to Figs. 17, 18 and 19 of a cross piece employing a hinged type of latch.

Figure 28:
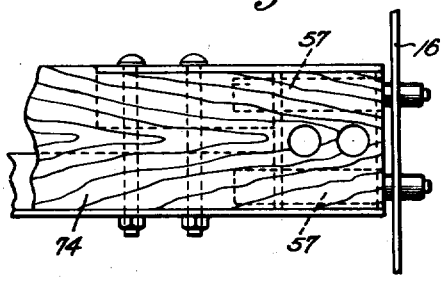
Figure 29:
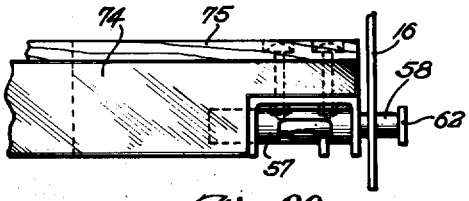

Figs. 28 and 29 are fragmentary top plan and side elevations showing the use of a plurality of latches upon a cross piece or partition member.

Figure 30:
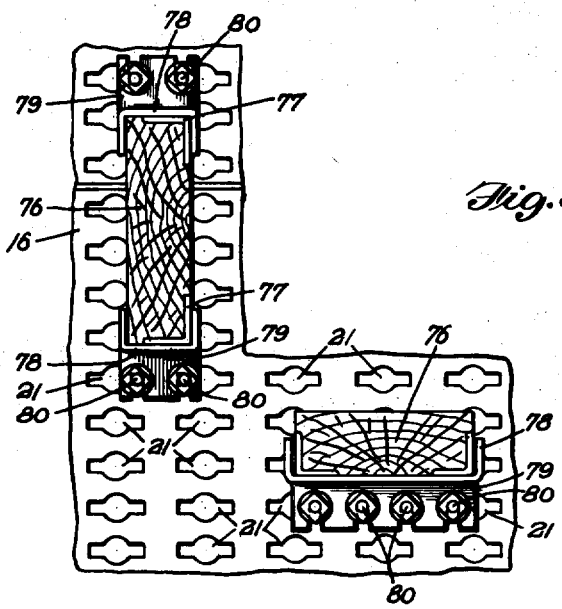

Fig. 30 is a fragmentary face view of a perforate wall sheet showing the use of fastening brackets for securing vertical and horizontal cross pieces or partition members thereto.

Figure 31:
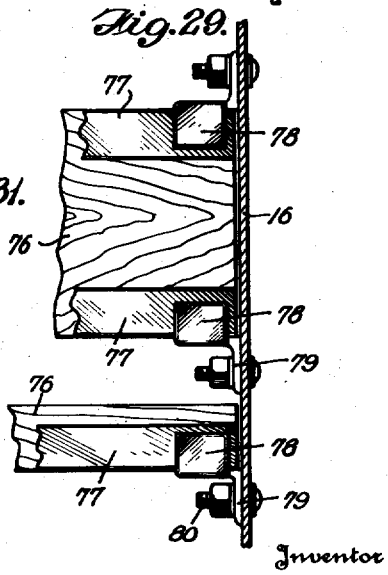

Fig. 31 is an end elevation of the same.

Figure 32:
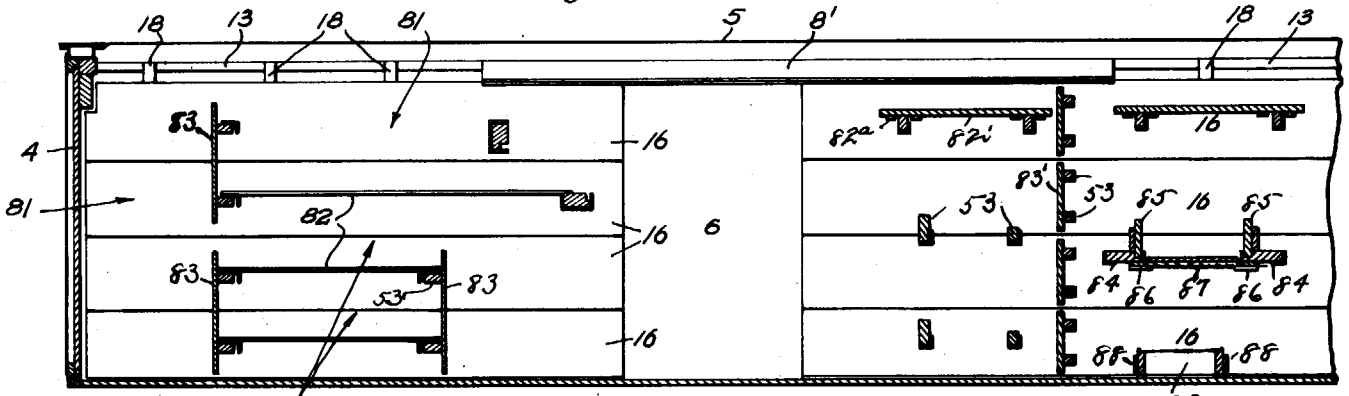

Fig. 32 is a diagrammatic view of the inside of the car showing some of the many arrangements which may be used for the formation of compartments or supporting platforms therein.

Figure 33:
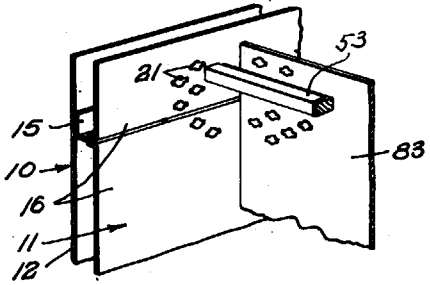

Fig. 33 is a view showing the use of perforated plates in cross partitions.

Figure 34:
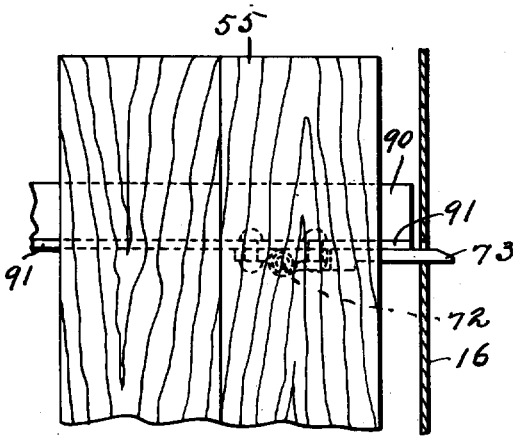
Figure 35:
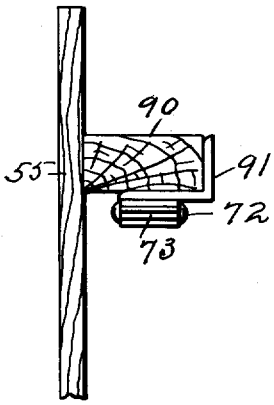

Figs. 34 and 35 are views similar to Figs. 25 and 26 showing modifications of the hinged latch shown therein.

Figure 36:
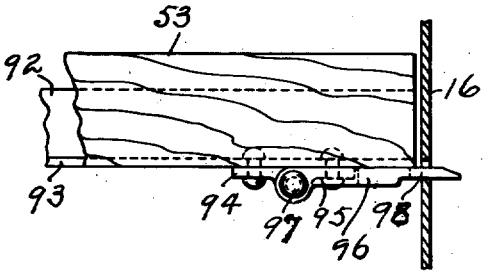
Figure 37:
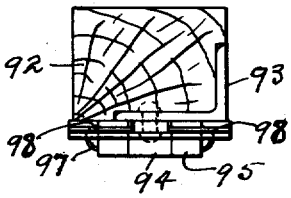

Figs. 36 and 37 are side and end views of a supporting member, showing still further modifications of the hinge latch pin.

Figure 38:
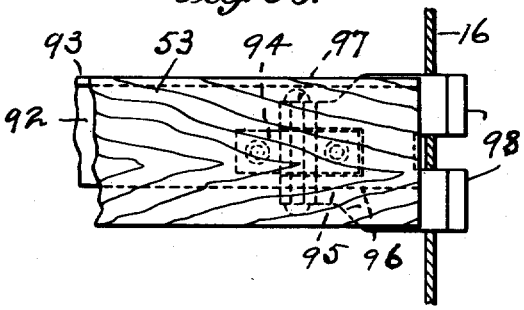

Fig. 38 is a plan view of the structure shown in Figs. 36 and 37.

Referring now more particularly to the drawings, 1 designates the car body which is of usual box body form, and comprises the bottom 2, side walls 3, end walls 4 and roof 5. The bottom 2, end walls 4 and roof 5 may be of any suitable and approved construction, the present invention as herein disclosed residing more particularly in a novel construction of the side walls 3, although it is to be understood that the end walls may be constructed in the same manner as the side walls in the event that it should also be desired to adapt the end walls to serve as supporting surfaces.

The principle of the invention consists in the construction of the side walls, the end walls, if desired, and supporting partitions also, if desired, of sheet metal perforate for the interchangeable detachable and locking engagement therewith of supporting or partitioning members of various types, forms and sizes, whereby compartments or platforms to receive or support articles or parts of different kinds, sizes and forms may be interchangeably provided whenever desired throughout the length, breadth and depth of the car, allowing the full internal area of the car, or any portion thereof, to be utilized for the storage and shipment of automobile or other parts so as to keep dissimilar lots separate and to enable these and other various kinds of articles which may be dissimilar in shape and size to be shipped in a safe, reliable, convenient and economical manner. Also the principle of the invention consists in constructing the doorways of the car so as to increase the available storage capacity of the car and in providing supporting and partitioning means for utilizing the portion of the body for storage purposes transversely of the body from doorway to doorway. Furthermore the principle of the invention consists in constructing the car walls which are to serve as supports in a strong and durable manner, and in providing supporting and partition forming members of interchangeable type for application to the supporting walls and to each other, whereby storage compartments or supporting platforms may be produced as circumstances may require at desired points and levels throughout the car body.

Each side wall 3 is provided with a central doorway 6 including terminal angle metal door posts 7, 7', an intermediate door post 8, and a metal lintel beam 8', and each portion of the wall 3 between each door post 7, 7' and the corner portion 9 at its intersection with the end wall 4 on the same side of the transverse center of the body comprises outer and inner wall sections 10 and 11. The outer wall section 10 is formed of vertically extending metal sheets 12 riveted or otherwise secured to each other at their lapping edges and also secured to the side sill channel and Z-bar eaves beams 13, to channeled intermediate posts 14, and to longitudinal (horizontal) angle beams 15 forming with the respective posts a rigid wall framing. The inner wall section 11 consists of longitudinally (horizontally) extending sheets 16, the lowermost sheet having its lower longitudinal edge flanged inwardly and secured to the floor by lag screws or bolts 17, the uppermost sheet having its upper longitudinal edge turned outwardly or toward the wall section 10 and secured at intervals along the major length of the car by brackets 18 to the eaves beam 13 and in the region of the doorway 6 to the lintel beam 8', the adjacent edges of the sheets of the series being flanged toward the wall section 10 and bolted, welded or riveted, as at 19, to the angles 15 and welded, as at 20, to the posts 14, the sheets of both wall sections 10 and 11 thus being firmly united to each other and to a rigid framing and providing a double wall of great strength to serve as a support for the partitioning and supporting members. This double wall structure is hollow, the wall sections 10 and 11 being held spaced by the framing, so that an air space is provided to insulate the interior of the car against rapid heat exchange action between the same and the outer atmosphere. This hollow space may, if desired, be filled with insulating material of any suitable and approved sort. As shown, the sheets 16 are perforate, being formed throughout with longitudinal (horizontal) and transverse (vertical) rows of slots or openings 21. Each opening is of double key-hole-shaped type, having alined straight end portions intersecting a central circular enlargement. These openings form keepers for interchangeable locking engagement with headed engaging and locking elements on partitioning and supporting members, as hereinafter described.

The doorway 6 in each wall is specially formed or modified as compared with a conventional construction in order that its width may be reduced when employing the car as a positioned car for the purpose set forth. To this end the intermediate door post 8 in each wall 3 is provided, and a door 22 is mounted so that it may be used to permanently close the space or half of the doorway between the post 8 and one of the terminal posts, as the post 7', as long as the car is used as a partitioned car, leaving the remaining half of the doorway between the posts 7 and 8 normally open for service use, but adapted to be closed whenever desired by a door 22'. By this means a narrow service doorway of sufficient width is left for access to the car and loading purposes as well as unloading purposes if desired, which narrow doorway may be conveniently closed, and this arrangement allows the closed half of the doorway to be packed solidly from side to side of the car to increase its storage capacity. Secured to the posts 7 and 8 at the sides of the open portion of the doorway are channeled holders 23 and 24, each consisting of a U-shaped channel member having a zig-zag partition strip 25 arranged therein and forming superposed holding sockets 23' and 24' of different depths. These sockets, in the case of the holder 23, are closed at their outer and inner sides and open only at the open side of the channel facing the doorway, while in the case of the holder 24 the sockets are not only open at the side facing the doorway but have lateral inlet and exit openings 25' formed by slots or notches in the outer flange of the holder 24. The car body thus constructed is adapted to be subdivided into goods holding compartments at desired points and levels or provided with goods supporting platforms at desired points and levels by means of partitioning and supporting members and doorways closing members of various kinds or types, some of which are herein shown, the construction and use of which I will now proceed to describe.

Figs. 11 to 16, inclusive, of the drawings show different sizes or depth and types of closure and supporting members for use across the open doorways to serve as supports for partitions or platform forming elements arranged to provide compartments or platforms at different points and levels from side to side of the car in the doorway region. As shown, these supports or partitions may be of different depths to secure a desired spacing of superposed platforms formed thereby. For example, a single piece or unitary wooden supporting member in the form of a bar 26 is provided to extend between the holders 23 and 24 with its ends seated in the proper sockets 23', 24' of the holders 23 and 24, the ends of which bar are partially cut away to form tongues 27 (one of which is shown) to engage the holder sockets. This bar may be of any suitable depth and one of these bars may be provided across each doorway at the sides of the car on which articles may be directly supported or on which planks may be laid to form a supporting platform. Fig. 12 shows another form of supporting member comprising a bar 28 reinforced by an angle iron wear piece 29 and to the base of which is secured a base piece 30 disposed edgewise at right angles thereto and forming therewith a supporting member of inverted T-shape in cross section. The ends of the bar 28 project beyond the ends of the base piece 30 and are cut away to form tongues 28', one of which is shown, for engagement with the sockets in the holders 23 and 24. On this support bars or planks extending transversely of the car may be laid to form a supporting platform for goods at a desired level. In the cases of the use of the bars 26 and 28 the platform bars or planks laid thereon may be nailed or otherwise properly secured thereto. In Fig. 13 is shown a supporting member comprising a bar 31 having an angle metal reinforcement 32 secured thereto, which bar may be of proper cross-sectional dimensions so that its ends may be fitted directly into proper sockets of the holders 23 and 24. To the upper surfaces of this bar one or more L-shaped or half-loop clips 33 may be secured, each to receive a supporting bar or plank 33' resting on the bar 31, and each clip having a clamping screw 34 to secure the supporting bar or plank in position. Fig. 14 shows a partition or supporting member 35 formed of three superposed bars united by angle metal ties 36, one end of the member 35 being formed to provide a tongue 37 to engage one of the sockets in the holder 23 and the other end of the member 35 being provided with spaced tongues 38 to engage a socket or adjacent sockets in the holder 24. This member is formed with spaced openings 39 to receive bars 39' on which platform boards may be laid or from which goods may be directly supported. The tie member 36 adjacent to the tongues 38 carries a pivoted latch 40 to engage the holder 24 to retain the member 35 against any possibility of casual displacement therefrom. Fig. 15 shows a supporting or partitioning member 41 composed of a pair of superposed bars secured together by tie blocks 42 and formed to provide at one end a tongue 43 to engage the holder 23 and at its opposite end with spaced tongues 44 to engage the holder 24. This member 41 is adapted to serve as a support for bars, planks or other goods supports or compartment or platform forming members. Fig. 16 shows a supporting or partitioning member 45 comprising spaced top and bottom bars 46 and 47 reinforced by metal angles 48 and connected and held in spaced relation by ties 49. Between the bars 46 and 47 one or more platform or goods supporting bars may be received and held in half clips 50 provided with clamping screws 51 or in a loop 52, one or more of which may be provided.

Supporting or partitioning members of the types shown in Figs 11 to 16, inclusive, may be used in pairs across the doorways at opposite sides of the car, to serve as auxiliary closures for said doorways in connection with doors or to serve as grate-like closures in the absence of doors. They also may be used to support compartment forming partitions or platform supporting bars whereby one or more compartments of different depths or platforms at different elevations may be formed across the car in the region of the doorways. In placing each supporting or partitioning member in position the tongued end thereof to be engaged with the holder 23 is slipped endwise into the proper socket in said holder and then the opposite tongued end is brought into alinement with the lateral notch or notches in the holder 24 communicating with the proper receiving socket therein and the said t[illegible]ued end is then slipped laterally through the notch or notches into the socket. By a reversal of this mode of application each supporting or partitioning member may be withdrawn from engagement with the holders, as will be readily understood.

Figs. 17 to 32, inclusive, show the supporting or partitioning members adapted for application to the perforate inner side walls, while Fig. 33 shows the use of perforate plates similar to the perforate wall plates as cross partitioning and supporting plates. In Figs. 17 to 20, inclusive, a partitioning member is shown comprising a supporting bar 53 having an angle metal reinforcement 54, to which bar are secured one or more partition boards or plates 55. At each end of the bar the reinforcement 54 projects and carries a U-shaped bracket 56 in which is mounted a casing 57 for a sliding latch bolt 58. This bolt has a pin 59 slidable in a guide slot 60 in the casing and engageable and disengageable by reverse rotary movements of the bolt with recesses 61 to lock the bolt in retracted and projected positions. The outer end of the bolt is provided with a T-head 62 of a size and shape corresponding to the perforations or openings in the perforate inner walls 16, the arrangement being such that when the bolt is retracted with the pin 59 in the slot 60 opposite the inner locking recess the head 62 of the bolt will lie, when the partition is disposed in position for engagement with an opening 21 in the perforate wall 16, with its head in position to pass through said opening, so that by means of the pin 59 the bolt may be projected so that the head will lie on the outer side of the wall 16 and then by rotating the bolt through an arc of 90° the head 62 may be turned to lie crosswise of the opening and locked in such position by engagement of the pin with the outer locking recess. By engagement of the locking bolt at the opposite end of the partition member with a corresponding opening in the opposite wall 16 and the placing of one or more other partitions and floor board or platform board supports in position for cooperation therewith a compartment of desired size and at any desired position in the length of the car and at any desired elevation may be provided.

Figs. 21 and 22 show a type of horizontal support which may be connected in a similar manner to opposite walls 16 and which comprises a filler bar 63 fitted and secured in a channeled metal reinforcing member 64 to which a pair of latch devices of the same construction shown in Figs. 17–20 are applied. Supporting bars of this type may be extended across the car body between and connected with the opposite wall sheets 16 either to directly support goods or to serve as supports on which planks or plates may be laid to form a goods supporting platform.

Figs. 23 and 24 show a supporting member formed of united wooden plies or bars 65 and 66, the former recessed at each end, as shown at 67, to receive a locking latch of the character previously described and the other being formed with a corresponding finger recess 68 to admit access to the latch pin of the latch bolt so that it may be conveniently operated.

Figs. 25, 26 and 27 show a construction of supporting bar member comprising a wooden bar 70 fitting within the channel 71 of a channeled reinforcement 69 and to which is hinged, as at 72, a swinging latch plate 73 having a projecting end to engage an opening in the sheet 16. This latch plate 73 rests against the underside of the bar when in engaging position so that it will be rigid with the bar when the weight of the bar and the load rests thereon, but upon lifting the bar the latches at its ends will be tilted downwardly and down out of engagement with the sheets 16, allowing ready and quick release of the bar from the sheets 16.

Figs. 28 and 29 show a supporting bar member comprising a bar 74 with reinforcement 75 and provided with a pair of spaced latch bolts of the character previously described for engagement with correspondingly spaced perforations or openings in a sheet 16, so that a supporting bar is provided which may be of considerable width and adapted to be held securely in place.

Figs. 30 and 31 show a bar or partition member 76 formed of wood with corner reinforcements 77 which is adapted to be secured either vertically or horizontally to a sheet 13, as shown in Fig. 30, by means of saddle brackets 78 engaging its opposite side edge or bottom face, which brackets have attaching flanges 79 slotted to receive fastening bolts 80 for engagement with the perforations or openings in the sheets. With this construction the brackets may be readily and conveniently applied in supporting or holding position and as readily removed and certain of the brackets may be left permanently in place under certain conditions, thus reducing time and labor in applying parts for use in making the same general shipments from time to time.

Fig. 32, as stated, shows an arrangement of supporting and partitioning members in a car so as to provide compartments 81 and platforms 82 for holding goods in position therein, while Figs. 32 and 33 also show the use of perforated plates 83 as cross partitioning plates which may be provided with latch bolts or the like to engage the perforations in the sheets 16, or carried by cross bars such as bars 53, 70, etc., so provided, and which are adapted for cooperation with longitudinally arranged partitions having latch members to engage the perforations therein, whereby provision is made for subdividing the interior of the car both longitudinally and transversely into compartments as desired.

Fig. 32 also shows the use of bars, such as bars 53 or any of the other styles herein disclosed, or of different dimensions and arranged to serve as supports for wooden platforms 82′ or wooden vertical partitions 83′. The platforms in such cases may be removably mounted in position and provided with cleats 82*a* to engage the bars and hold the platforms from shifting. Of course, metal platforms so constructed may be used and the partitions 83′ may be made of metal, perforate or imperforate, and they may be directly supported from the side walls instead of being supported by bars 53. Fig. 32 further shows a structure in which bars 84 carrying uprights or partitions 85 are provided with cleats or ledges 86 to support a platform board or plate 87 to form a trough-like or cradle-like holder for lading, and in Fig. 32 is also shown a rack or holder formed of bars or partitions 88 connected by cross pieces 89 and which, as shown in the particular instance, is arranged to form with the floor a shallow receptacle for holding lading of a certain or various kinds.

In Figs. 34 to 38, inclusive, I have shown still other types of bars with hinged latch plates instead of bolts which may be employed. In Figs. 34 and 35 a wooden bar 90 is shown which is provided with an angle metal reinforcement 91, one part of which underlies the bar, and to which parts a hinged latch 72, 73 of the kind shown in Figs. 25, 26 and 27 is riveted or otherwise applied. This bar may serve as a support for a partition member 55. In Figs. 36, 37 and 38 is shown a bar 92 having an angle metal reinforcement 93 one part of which underlies the bar and to which is applied a latch comprising a hinging plate 94 riveted or otherwise secured to said reinforcement part which is embraced by the forked part 95 of a latch member 96 connected thereto by a hinge pin 97, the opposite end of the latch member having a pair of duplicate or twin latch portions 98 to engage a pair of adjacent openings in a plate 16.

By the use of any one or more of the several styles of supporting and partitioning members the interior of the car body may be provided with compartments and supporting members or supporting platforms whereby the entire area of the interior of the body may be employed for storage purposes and parts or goods to be shipped supported singly or in lots therein so that the lots may be kept separate for convenience in shipping and loading and unloading them as well as in transferring them from place to place.

It will be observed that the supporting member 16 bridging the spaces between the intermediate posts of each side wall on opposite sides of the doorway in said wall lie in a common longitudinal plane or flush with each other, and that the supporting members which bridge the space between the doorway posts of each wall when placed in position lie in the same longitudinal plane as and flush with the aforesaid members 16 of the wall. By this arrangement all of the transverse supporting or partitioning members extended across the car between wall sheets or members 16 of the opposed walls, or between the supporting members bridging the door posts at the opposite sides of the car, may be made of the same length for interchangeable use and engagement with any sets of oppositely disposed and transversely alined supporting members on the opposed walls.

From the foregoing description, taken in connection with the drawings, the construction and mode of operation of my improved partitioned car construction will be readily understood and its advantages appreciated by those versed in the art without a further and extended description. While the constructions disclosed are preferred, it will, of course, be understood that changes in the form, proportions and details of construction of the parts may be made within the scope of the appended claims without departing from the spirit or sacrificing any of the advantages of the invention.

Although the foregoing covers applications to cars with double doors, it should be specifically understood that the invention herein described may readily be applied to cars having single side doors and with any form of side post, eaves beams, or side sill.

What I claim is:—

1. In a box type freight car, the combination of a car body having oppositely disposed walls, each wall comprising spaced outer and inner vertical wall sections, said inner wall sections extending substantially from roof to floor, the inner wall sections of the walls being provided throughout the wall sections with correspondingly arranged vertical and horizontal rows of openings therein, a plurality of supports adapted to be extended between and mounted upon the inner wall sections of said oppositely disposed walls for supporting therefrom horizontally arranged vertical load carrying shelves and vertically arranged load carrying partitions or load displacement preventing abutments at different points in horizontally and vertically spaced relationship to each other on said walls, said supports having engaging elements interchangeably engageable with the openings in the inner wall sections to mount the individual supports at different points in horizontally or vertically spaced relationship to each other on the opposed walls, and reinforcing and bracing means in the spaces between the outer and inner wall sections of the respective walls rigidly uniting the inner and outer wall sections of each wall and sustaining the inner wall sections against distortion or collapse under the strains of the load weights supported by the mounted supports therefrom.

2. In a box type freight car, the combination of a car body having oppositely disposed walls, each wall comprising spaced outer and inner vertical wall sections, said inner wall sections extending substantially from roof to floor, posts arranged between the wall sections and supporting the outer wall sections, the inner wall sections of each wall being formed of parallel metal sheets having flanges at their juxtaposed edges bent outwardly toward the associated outer wall section, and said inner wall sections being provided throughout the wall sections with correspondingly arranged vertical and horizontal rows of openings therein, a plurality of supports adapted to be extended between and mounted upon the inner wall sections of said oppositely disposed walls for supporting therefrom horizontally arranged vertical load carrying shelves and vertically arranged load carrying partitions or load displacement preventing aboutments at different points in horizontally and vertically spaced relationship to each other on said walls, said supports having engaging elements interchangeably engageable with the openings in the inner wall sections to mount the individual supports at different points in horizontally or vertically spaced relationship to each other on the opposed walls, and longitudinally extending reinforcing and bracing elements in the spaces between the outer and inner wall sections of the respective walls secured to the posts and flanges of the inner walls and coacting therewith to rigidly unite the inner and outer wall sections of each wall so as to sustain the inner wall sections against distortion or collapse under the strains of the load weights supported by the mounted supports therefrom.

3. In a box type freight car, the combination of a car body having oppositely disposed walls, each wall comprising spaced outer and inner vertical wall sections, said inner wall sections extending substantially from roof to floor, the inner wall sections of the walls being provided throughout the wall sections with correspondingly arranged vertical and horizontal rows of horizontally elongated openings therein, said rows of openings being staggered with relation to each other, a plurality of supports adapted to be extended between and mounted upon the inner wall sections of said oppositely disposed walls for supporting therefrom horizontally arranged vertical load carrying shelves and vertically arranged load carrying partitions or load displacement preventing abutments at different points in horizontally and vertically spaced relationship to each other on said walls, said supports having engaging elements interchangeably engageable with the openings in the inner wall sections to mount the individual supports at different points in horizontally or vertically spaced relationship to each other on the opposed walls, and reinforcing and bracing means in the spaces between the outer and inner wall sections of the respective walls rigidly uniting the inner and outer wall sections of each wall and sustaining the inner wall sections against distortion or collapse under the strains of the load weights supported by the mounted supports therefrom.

4. In a box type freight car, a car body having a wall comprising spaced outer and inner vertical wall sections, said inner wall section extending substantially from roof to floor, the inner wall section being provided substantially throughout its area with vertical and horizontal rows of openings therein, a plurality of supports adapted to be mounted upon the inner wall section for supporting therefrom horizontally arranged vertical load carrying shelves and vertically arranged partitions or load carrying or displacement preventing abutments at different points horizontally and vertically of said walls, said supports having engaging members at one end for interchangeable engagement with any of said openings to mount the individual supports at different points in horizontally or vertically spaced relation to each other on the inner wall, means for supporting the opposite ends of said supports, and reinforcing and bracing means in the space between the outer and inner wall sections of the wall rigidly uniting said inner and outer wall sections so as to sustain the inner wall section against buckling or collapse under the strains of the load weights supported therefrom by the mounted supports.

5. In a box type freight car, a car body having a wall comprising spaced outer and inner vertical wall sections, said inner wall section extending substantially from roof to floor, the inner wall section being provided substantially throughout its area with vertical and horizontal rows of openings therein, a plurality of supports adapted to be mounted upon the inner wall section for supporting therefrom horizontally arranged vertical load carrying shelves and vertically arranged partitions or load displacement preventing abutments at different points horizontally and vertically of said walls, slidable and rotatable engaging members on the supports having T-headed ends for interchangeable engagement at one end with any of said openings to mount the individual supports at different points in horizontally or vertically spaced relation to each other on the inner wall, means for supporting the opposite ends of said supports, and reinforcing and bracing means in the space between the outer and inner wall sections of the wall rigidly uniting said inner and outer wall sections so as to sustain the inner wall section against buckling or collapse under the strains of the load weights supported by the mounted supports therefrom.

6. In a box type freight car, a car body having a wall comprising spaced outer and inner vertical wall sections, said inner wall section extending substantially from roof to floor, the inner wall section being provided substantially throughout its area with vertical and horizontal rows of openings therein, a plurality of supports adapted to be mounted upon the inner wall section for supporting therefrom horizontally arranged vertical load carrying shelves and vertically arranged partitions or load displacement preventing abutments at different points horizontally and vertically of said walls, each support having an engaging member pivotally mounted at its inner end on the lower face of said support adjacent an end thereof and said engaging member having a free outer end portion for interchangeable engagement with any of said openings to mount the support at different points horizontally or vertically on the inner wall, means for supporting the opposite ends of the supports, and reinforcing and bracing means in the space between the outer and inner wall sections of the wall rigidly uniting said inner and outer wall sections so as to sustain the inner wall section against buckling or collapse under the strains of the load weights supported therefrom by the mounted supports.

7. In a railway box car, longitudinally spaced posts at the sides of the car, an outer enclosing wall formed of wall sheets secured to the posts, perforated inner goods supporting wall sheets spaced from the outer wall sheets, said inner wall sheets extending longitudinally of the car and being disposed contiguously one above another between the car floor and roof lines to provide wall surfaces having perforations extending substantially from the floor to the roof of the car, the perforations in each inner wall sheet extending along the sheet from end to end thereof, and said inner wall sheets bridging adjacent posts and being connected thereto and supported thereby, and adjustable supports extending transversely of the car and having projections at the ends thereof engaging selected perforations of said inner wall sheets, said supports being bodily adjustable vertically or longitudinally of the car at any point longitudinally of the wall sheets for engagement of said projections with selected perforations at any point in the length of the walls or height thereof between floor and roof.

8. In a railway box car, longitudinally spaced posts at each side of the car including end posts, door posts and intermediate posts, said door posts having keepers disposed at spaced intervals substantially from the floor to the roof of the car, superposed adjustable supports adapted to bridge across between the door posts and having end projections to engage selected keepers thereof, an outer enclosing wall formed of wall sheets secured to the posts, inner goods supporting wall sheets spaced from the outer wall sheets, said inner wall sheets extending longitudinally of the car and disposed above one another at levels between the floor and roof of the car and forming with the adjustable supports between the posts supporting surfaces at each side of the car extending from end to end of the car, each inner wall sheet having perforations extending along the sheet from end to end thereof, said inner wall sheets bridging adjacent posts and being supported thereby and having flanges thereon engaging and spacing the same from the posts, and adjustable supports extending transversely of the car and having projections at the ends thereof interchangeably engageable with selected perforations at any point in the length and height of said inner wall sheets.

9. In a railway box car, side walls having posts, goods supporting members supported on the inner faces of the posts, said supporting members comprising longitudinally extending sheets mounted one above another and adjoining each other at different levels in the height of the walls substantially between the floor and the roof of the car, each sheet having perforations extending therealong from end to end and flanges thereon engaging and spacing the same from the posts, and adjustable cross bars disposed transversely of the car and bodily adjustable at any point in the length of the car both longitudinally and vertically of the perforated sheets and having projections at the ends interchangeably engageable with selected perforations of said supporting sheets at any point in the length and height of the walls.

10. In a railway box car, side walls having posts, goods supporting members on the inner faces of the posts, said supporting members comprising longitudinally extending sheets mounted one above another and adjacent each other at different levels in the height of the walls substantially between the floor and the roof of the car, each sheet having a plurality of horizontal rows of closely spaced perforations extending therealong from end to end with the perforations of one row staggered with relation to the perforations of an adjacent row and each sheet having flanges thereon engaging and spacing the same from the posts, and cross bars disposed transversely of the car and adjustable at any point in the length of the walls longitudinally and vertically of the supporting sheets and having projections at the ends thereof interchangeably engageable with the perforations at any point in the length or height of said supporting sheets.

11. In a railway box car, longitudinally spaced channel shaped posts at the sides of the car having their channels facing outwardly, a wall fastened to the side flanges of the posts, so that the webs of said posts are spaced inwardly from said wall, longitudinally extending inner goods supporting sheets bridging the posts and connected to and supported by the webs thereof, said sheets being arranged on each wall at adjoining levels in the height of the wall substantially between the floor and the roof of the car and each having perforations extending therealong from end to end, and supports adjustable at any point in the length of the walls longitudinally and vertically of said walls and extending transversely of the car and having projections at the ends thereof interchangeably engageable with selected perforations of said inner supporting sheets at any point in the length and height of any of said sheets.

12. In a box type freight car, longitudinally spaced posts at each side of the car body, a wall at each side of the car body comprising sheets affixed at the outer sides of the posts, goods supporting means at the inner sides of the posts comprising sheets extending longitudinally of the car and bridging adjacent posts, said goods supporting sheets being in close relation in adjoining relationship at different levels between the floor and the roof of the car, each goods supporting sheet being provided with perforations extending therealong from end to end, some of said perforations facing the posts, supports adapted to be extended transversely of the car between the goods supporting sheets and to be adjusted at any point in the length of said sheets longitudinally and vertically of said sheets and having engaging elements at their ends interchangeably engageable with the perforations in the goods supporting sheets at any point in the length and height thereof, and bracing and supporting projections on the goods supporting sheets engaging said posts and supporting said sheets therefrom in spaced relation thereto to accommodate the projections on the transverse supports engaged with the perforations facing the posts.

13. In a box type freight car, longitudinally spaced posts at each side of the car body, a wall comprising sheets attached to the outer faces of the posts, goods supporting members on the inner faces of the posts formed of parallel metal sheets extending longitudinally of the car and bridging the posts and arranged one above another and adjoining one another at different levels between the floor and roof of the car, said goods supporting sheets being each provided with at least two rows of perforations extending therealong from end to end, said sheets being mounted in horizontally and transversely alined pairs at opposite sides of the car, a support adapted to be extended transversely of the car between any two horizontally and transversely alined goods supporting sheets and to be adjusted at any point in the length of said sheets longitudinally and vertically thereof and having projections at the ends thereof interchangeably engageable with selected matching perforations of the alined sheets at any point in the length and height thereof, and reinforcing and supporting projections on the goods supporting sheets engaging the posts and supporting said sheets therefrom in spaced relation thereto.

14. In a box type freight car, longitudinally spaced posts of U-shaped cross section having their open sides facing outwardly and their webs facing inwardly, wall sheets fastened to the outer faces of the posts and closing the open sides thereof, goods supporting sheets extending longitudinally of the car on the inner sides of the posts and bridging adjacent posts, said goods supporting sheets being arranged one above another at adjoining levels between the floor and roof levels of the car and each provided with a row of perforations extending therealong from end to end, cross bars disposed transversely of the car and adjustable at any point in the length of the walls longitudinally and vertically of said walls having projections at their ends selectively engageable with any of the perforations of the goods supporting sheets at any point in the length and height of said sheets, and means on the goods supporting sheets engaging the webs of the posts and supporting said sheets therefrom.

15. In a box type freight car, the combination of a car body having at each side longitudinally spaced posts, outer wall sheets secured to the outer faces of the posts and inner goods supporting sheets or racks arranged on the inner sides of the posts in superposed and adjoining relationship at different elevations from roof to floor, each goods supporting sheet or rack bridging adjacent posts and being provided with rows of openings extending therealong, a plurality of supports adapted to be extended transversely of the car and to be adjusted at any point in the length of the goods supporting sheets horizontally and vertically of said sheets and to be interchangeably mounted upon said goods supporting sheets for supporting therefrom horizontally arranged load carrying shelves or vertically arranged load carrying partitions or load displacement preventing abutments at different points in horizontally and vertically spaced relationship to each other, said supports having engaging elements at their ends interchangeably engageable with the openings at any point in the length and height of said goods supporting or rack sheets, and supporting and reinforcing means on said inner goods supporting or rack sheets engaging the posts and supporting said sheets therefrom in spaced relation thereto.

16. In a railway box car, longitudinally spaced posts affixed at the sides of the car including end posts, door posts and intermediate posts, supporting members adapted to be disposed to bridge adjacent pairs of door posts and having perforations therein, supporting members bridging the spaces between the intermediate posts and end posts at each side of the car, all of said members, including those between the door posts when supported in position, being disposed substantially in a common longitudinal plane, and each of the latter-named supporting members being supported upon the posts in spaced relation thereto and having a plurality of horizontal rows of closely spaced perforations extending therealong from end to end with the perforations of one row staggered with relation to the perforations of an adjacent row, and adjustable cross members disposed transversely of the car and adjustable at any point in the length of the car vertically and horizontally of the second-named supporting members and having projections at the ends thereof interchangeably engageable with the perforations of said supporting members at any point in the length and height thereof.

17. In a box car, a car body having a doorway with a row of keepers at each side of the doorway extending substantially from bottom to top of the doorway, and a vertically adjustable partitioning or supporting member adapted to be positioned across the doorway at any elevation and engaged with selected keepers, said member being movable into and out of operative position with relation to the doorway in a direction transversely and longitudinally of the car and provided at its opposite ends with engaging means for engagement with the keepers, the engaging means at at least one end of the supporting member comprising a sliding bolt mounted thereon for movement into and out of keeper engaging position.

18. In a railway box car, longitudinally spaced posts forming parts of the side frames of the car, said posts being channel shaped with their channels facing outwardly and closed by the side walls and with their webs spaced inwardly from the side walls, side racks bridging adjacent posts and supported from the webs of the posts in spaced relation thereto, said side racks having perforations extending therealong, and cross bars disposed transversely of the car and adjustable at any point in the length of said racks vertically and horizontally thereof and having projections at the ends thereof interchangeably engageable with selected perforations of said side racks at any point in the length and height thereof.

19. In a railway box car, longitudinally spaced posts forming parts of the side frames of the car, said posts being of U-shaped cross section, and each having a web portion spaced inwardly from the side walls of the car, side racks bridging adjacent posts and having perforations extending therealong, said side racks being provided with supporting means engaging the webs of the posts and supporting the same therefrom and in spaced relation thereto, and cross bars disposed transversely of the car and adjustable at any point in the length of the car vertically and horizontally of the racks and having perforations at the ends thereof interchangeably engageable with selected perforations at any point in the length and height of said racks.

20. In a railway box car, longitudinally spaced posts at the sides of the car, said posts being of U-shaped cross section, and each having a web portion spaced inwardly from the side wall of the car, side racks bridging adjacent posts and provided with perforations extending therealong, said racks also being provided with projections extending therefrom toward the posts and supporting the racks from and in spaced relation to the webs of the posts, and adjustable cross bars disposed transversely of the car and movable at any point in the length of the racks vertically and horizontally thereof having projections at the ends thereof interchangeably engageable with selected perforations of said racks.

21. In a box car, a car body having supporting surfaces mounted vertically in opposed and spaced relation to each other and each having a vertical row of perforations therein, and an adjustable supporting member bridging the space between said surfaces and having means at each end thereof engageable with the perforations in said surfaces, said engaging means at at least one end of the member comprising a tongue hinged to the underside of the member by a pivot extending transversely of the member and located inwardly of the end of the member for movement toward and from the same to locking and releasing positions and supporting and non-supporting positions with relation to said member.

22. In a railway box car, opposed supporting members on the car body each having a vertical row of alined regularly spaced perforations therein extending substantially from floor to roof of the car, and an adjustable supporting member bridging the space between said members and adjustable to register with alined perforations at any height between the floor and roof of the car and having at each end a plurality of spaced projections to engage selected alined perforations of the supporting members.

23. In a railway box car, opposed supporting members on the car body each having a vertical row of regularly spaced perforations therein, and a supporting element bridging the space between said members and having projections at each end to engage selected perforations of the supporting members, at least one of said projections comprising a plate forked to provide spaced projections.

24. In a box type freight car, the combination of a car body having oppositely disposed walls, each wall comprising longitudinally spaced posts and spaced outer and inner vertical wall sections, said inner wall sections comprising sheets extending longitudinally of the car and being arranged in parallel relation one above another contiguous to each other to collectively cover the space substantially from floor to roof of the car, the inner wall sheets of the walls being provided throughout the wall sheets with correspondingly arranged vertical and horizontal rows of horizontally elongated openings therein, said rows of openings being staggered with relation to each other, a plurality of supports adapted to be extended between and mounted upon the inner wall sheets of said oppositely disposed walls for supporting therefrom horizontally arranged vertical load carrying shelves and vertically arranged load carrying partitions or load displacement preventing abutments at different points in horizontally and vertically spaced relationship to each other on said walls between the floor and roof levels, said supports being bodily adjustable at any point in the length of the inner wall sheets vertically and horizontally of said wall sheets and having engaging elements at their ends interchangeably engageable with the openings in the inner wall sheets at any point in the length and height of said wall sheets to mount the individual supports at different points in horizontally or vertically spaced relationship to each other on the opposed walls, said inner wall sheets bridging adjacent posts, and means supporting said inner wall sheets from said posts.

WILLIAM L. THOMAS.